United States Patent
Lang (10) Patent No.: US 10,972,602 B1
(45) Date of Patent: Apr. 6, 2021

(54) CALL INDICATORS FOR CATEGORIES OF CALLS

(71) Applicant: AT&T Intellectual Property I, L.P., Atlanta, GA (US)

(72) Inventor: Howard L. Lang, Wayside, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/657,530

(22) Filed: Oct. 18, 2019

(51) Int. Cl.
*H04M 3/42* (2006.01)
*H04M 3/22* (2006.01)
*H04M 3/436* (2006.01)

(52) U.S. Cl.
CPC ..... *H04M 3/42051* (2013.01); *H04M 3/2218* (2013.01); *H04M 3/2281* (2013.01); *H04M 3/436* (2013.01)

(58) Field of Classification Search
USPC ......... 379/88.19, 88.2, 88.21, 142.1, 142.04, 379/142.06, 207.15
See application file for complete search history.

(56) References Cited

U.S. PATENT DOCUMENTS 7,991,134 B2 * 8/2011 Kim ...................... H04M 1/006
379/142.01
2018/0324297 A1 * 11/2018 Kent ...................... H04M 3/436

* cited by examiner

*Primary Examiner* — Yosef K Laekemariam (57) ABSTRACT

In one example, a processing system including at least one processor may obtain a call request from a calling device to a destination device, identify a caller category associated with the calling device, and forward the call request to the destination device with an indicator of the caller category, where the indicator of the caller category is to cause the destination device to present at least one of: a first ringtone that is associated with the caller category or a first vibration pattern that is associated with the caller category.

19 Claims, 4 Drawing Sheets

CALL INDICATORS FOR CATEGORIES OF CALLS

The present disclosure relates generally to unwanted calls and/or verified calls to mobile endpoint devices, and more particularly to apparatuses, computer-readable media, and methods for forwarding a call request to a destination device with an indicator of a caller category to cause the destination device to present at least one of a ringtone or a vibration pattern associated with the caller category, and to apparatuses, computer-readable media, and methods for obtaining a call request with an indicator of a caller category and presenting at least one of a ringtone or a vibration pattern that is associated with the caller category.

BACKGROUND

Unwanted calls, which may be fraud, spam, telemarketing, or the like, are a primary source of consumer complaints. Network-based or user endpoint device-based handling of unwanted calls may include call blocking, routing to voicemail, or presenting visual warning information, such as "suspected spam."

SUMMARY

The present disclosure broadly discloses apparatuses, non-transitory (i.e., tangible or physical) computer-readable storage media, and methods for forwarding a call request to a destination device with an indicator of a caller category to cause the destination device to present at least one of a ringtone or a vibration pattern associated with the caller category. For instance, in one example, a processing system including at least one processor may be deployed in a communication network, and may obtain a call request from a calling device to a destination device, identify a caller category associated with the calling device, and forward the call request to the destination device with an indicator of the caller category, where the indicator of the caller category is to cause the destination device to present at least one of: a first ringtone that is associated with the caller category or a first vibration pattern that is associated with the caller category.

The present disclosure also broadly discloses apparatuses, non-transitory (i.e., tangible or physical) computer-readable storage media, and methods for obtaining a call request with an indicator of a caller category and presenting at least one of a ringtone or a vibration pattern that is associated with the caller category. For instance, in one example, a processing system including at least one processor may obtain a call request with an indicator of a caller category, reference the caller category to at least one of: a first ringtone that is associated with the caller category or a first vibration pattern that is associated with the caller category, and present at least one of the first ringtone that is associated with the caller category or the first vibration pattern that is associated with the caller category.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Examples of the present disclosure include apparatuses, computer-readable media, and methods for forwarding a call request to a destination device with an indicator of a caller category to cause the destination device to present at least one of a ringtone or a vibration pattern associated with the caller category, as well as apparatuses, computer-readable media, and methods for obtaining a call request with an indicator of a caller category and presenting at least one of a ringtone or a vibration pattern that is associated with the caller category. In particular, examples of the present disclosure provide at least one of a distinct audible ring tone or distinct vibration pattern, associated with each incoming unwanted call, so that the user is informed before even touching the mobile phone. This may save a user from being interrupted by an unwanted call, when it may be inconvenient or unsafe to pick up the phone. In one example, the present disclosure may alternatively or additionally provide at least one of a distinct audible ring tone or distinct vibration pattern associated with a verified or "valid" call, which may encourage a user to pick-up when the call is asserted to be non-malicious. Examples of the present disclosure also provide for greater accessibility for users who may be visually impaired. For instance, for a call with only a visual warning, there may be a change to the caller name identifier (ID) label (e.g., "Suspected Spam"), or other warning icon on the phone display. A user must take action to pick up the phone to view the caller name ID warning label or warning icon. However, this may be unsafe or the user may be incapable of viewing such a label.

In accordance with the present disclosure, an audible alert of an unwanted call may be a different ringtone than a currently selected "standard" ringtone of a mobile endpoint device, which may have a default value and/or which may be user-selected. In one example, the user may select a desired ringtone to represent unwanted calls, or particular distinct ringtones to represent particular categories of unwanted calls. Similarly, in accordance with the present disclosure, a vibration alert for an incoming unwanted call may comprise a distinct vibration pattern to be presented via the mobile endpoint device (which in one example may also be customized by the user). In accordance with the present disclosure, for an incoming unwanted call, an audible alert, a vibration alert, or both may be triggered via specific caller name ID labels, such as "Suspected Spam" or "Telemarketer," to trigger the distinctive audible or vibration alert.

To illustrate, one example of the present disclosure may include a network-based processing system to process a call request (e.g., call setup signaling message(s)) in order to identify a caller category of a caller and/or source device associated with the call request and to insert the caller category into a caller name ID field of the call request (e.g., into the headers of one or more call setup signaling messages). In one example, the present disclosure may also include a mobile endpoint device application that detects the specific caller category in the caller name ID field of the incoming call request messaging and that triggers a corresponding distinctive audible and/or vibration alert to be presented via the mobile endpoint device. In another example, the present disclosure may include specific network signaling to the mobile endpoint device, to trigger the distinctive audible or vibration alert. For instance, a separate signaling message may be sent from the network-based processing system to be received and processed via the application on the mobile endpoint device. The signaling message may include the caller category that is identified. As such, the application of the mobile endpoint device may be caused to present a distinctive audible and/or vibration pattern alert in accordance with the caller category.

In one example, the network-based processing system may determine the caller category by extracting a "caller identifier" or "caller ID," which may comprise at least one of: a phone number, a caller name identifier (ID), an International Mobile Subscriber Identity (IMSI), an International Mobile Equipment Identity (IMEI), or the like from the call request and obtaining an entry in a caller category database associated with the caller ID, where the entry associates the caller ID with the a caller category. In general, the caller ID is any single identifier or combination of identifiers contained in a call request (e.g., one or more call setup signaling messages) that can be used to identity a caller and/or a particular calling device. In one example, each caller ID may have a caller category associated therewith. In another example, caller IDs being associated with an unwanted caller category may have a record indicating such a designation, while caller IDs that are not associated with an unwanted caller category may have a record without a designation, or an empty entry for a caller category designation. In still other examples, caller IDs not within an unwanted caller category may have no record in the database, or may have a record with a positive or neutral designation of a caller category, such as "trusted," "verified," "unknown," etc.

In one example, the caller category is associated with the caller ID and stored in the entry in the database in accordance with at least one machine learning model (MLM), e.g., a trained machine learning algorithm (MLA). For instance, the at least one MLM may be configured to assign the caller ID to a caller category from among a plurality of possible caller categories based upon data gathered via the communication network relating to a plurality of calls associated with the caller ID, such as call detail records (CDRs), feedback from called parties (e.g., an indication of positive/negative/neutral, an indication of wanted/unwanted, an indication of a specific category, such as fraud, spam, telemarketer, political, survey, or the like, and so on), reputation information from other communication networks or online sources, and so forth. For instance, data from CDRs that may be input to the one or more MLMs may include a number of calls, the Internet Protocol (IP) address(es) associated with the caller ID and/or a telephone number, the location on the origination of a call (e.g., for mobile devices, or devices that are generating calls from or via an IP network, etc.), and so on. It should be noted that a caller ID may comprise the telephone number, or the caller ID may be a separate indicator from the telephone number such as a user's name, an organization name, etc. In other examples, the caller ID may also comprise an IP address, a media access control (MAC) address, an International Mobile Equipment Identifier (IMEI), an International Mobile Subscriber Identity, (IMSI), etc. In one example, the input data (e.g., training data, or training data and testing data) may relate to a volume of historical calls associated with each caller ID, where the data is labeled with known results based upon the caller feedback, via investigation and manual labeling by network personnel, e.g., in response to one or more specific and credible complaints, and so on.

In one example, each caller category may have an associated MLM that may be configured to determine whether a call is from a caller and/or a calling device that is or is not of the caller category. For instance, each MLM may comprise a binary classifier to make a yes/no decision as to whether the caller is or is not part of the class (e.g., a particular caller category). In another example, a caller category may be determined via a decision tree algorithm-based MLM, where leaves indicate a conclusion of the caller being of a particular class (e.g., where at least one leaf may indicate a default class, such as "unknown" or "not known to be of an unwanted caller category"). In various other examples, different type(s) of MLM(s) or different sets of MLMs may be deployed.

In one example, the application of the mobile endpoint device may have records which associate each category of unwanted caller with a distinctive audible alert (e.g., a distinctive ringtone) and/or distinctive vibration pattern. In one example, the distinctive audible alert and/or distinctive vibration pattern may distinguish the call as being from a caller in an unwanted caller category (e.g., as compared to a caller that is in the user's contact list, a caller that is in a safe, trusted, and/or verified caller list, a caller that is not known to be of an unwanted caller category, etc.). In addition, in one example, the distinctive audible alert and/or distinctive vibration pattern may distinguish the call as being from a caller in a particular unwanted caller category, e.g., as compared to other unwanted caller categories. However, it should be noted that in one example, the distinctive audible alert and/or distinctive vibration pattern may not necessarily be unique to the particular unwanted caller category, but may be used for two or more of the different unwanted caller categories. For instance, the distinctive audible alert and/or distinctive vibration pattern for each unwanted caller category may be selected by a user, who may choose to have the same audible alert for both "telemarketer" and "survey" categories of unwanted callers. Nevertheless, the audible alert may remain different from the audible alert(s) (e.g., ringtone(s)) for known contacts of the user, callers not assigned to an unwanted caller category, etc.

It should be noted that some categories of unwanted calls may still be blocked in accordance with network policy, the user's preferences, a preference of an organization providing the user's mobile endpoint device (e.g., a corporate phone), etc. However, for other categories of unwanted calls, a user may still desire to be notified of such calls, and may selectively accept or ignore such calls. In one example, a mobile endpoint device-based application of the present disclosure may enable a user or administrator to select one or more categories for call blocking, for distinctive audible alert(s) and/or vibration pattern(s), or for non-differentiated call alerting. Alternatively, or in addition, a network provider, an administrator of the mobile endpoint device, or other management entity may customize call handing for a mobile endpoint device via a network-based processing system (e.g., a server of the present disclosure). For instance, an administrator may log-in to a management account and may customize call handling for the mobile endpoint device by selecting from among call blocking, distinctive audible alert and/or vibration pattern, or no distinctive call handing for each unwanted caller category (e.g., where the selections may be pushed from the network-based processing system to the corresponding mobile endpoint device-based application). Alternatively, or in addition, the selected call handing options may be implemented in the network, e.g., as part of the network-based processing system or via one or more other network-based components. For instance, the network-based processing system may implement call blocking at one or more locations (e.g., at one or more devices) in the network, such as at a call session control function (CSCF), at a packet data network gateway (PGW, or PDN-GW), another type of gateway and/or router, and so forth. In one example, the network-based processing system and/or other network-based components may omit unwanted caller category information from being sent to the mobile endpoint device, which may prevent the application of the mobile endpoint device from applying distinctive audible alert and/or vibration pattern for one or more unwanted caller categories, and so forth, depending upon the selected call handing configuration.

In one example, an application of the mobile endpoint device may provide for a local override of distinctive audible alert or vibration pattern based upon an unwanted caller category. For instance, a user of the mobile endpoint device may have a friend or family member who works as a telemarketer. The calling telephone number may be designated for blocking or distinctive ringing and/or vibration pattern alerting according to the caller category of "telemarketer". However, since the calling telephone number may be in the user's contact list, the mobile endpoint device may override the ringing and/or vibration designation of the caller category and instead treat the call as a known caller, trusted caller, etc. In one example, an override of a designated blocking or alerting of a caller category may also be applied in the network. For instance, the user may allow the application of the mobile endpoint device to share the user's contact list with the network-based processing system, which may check the contact list and override the caller category signaling when the number of the calling party in the contact list.

In one example, the present disclosure may also provide for distinctive audible and/or vibration pattering alerting for one or more positive caller categories. For instance, a telecommunication network may provide a caller verification process whereby callers (or their devices) may be digitally verified. In other words, the verification of a caller/calling device may guarantee that the calling number and/or caller name ID has/have not been spoofed and that the asserted calling name and/or number is/are the actual source of the call. In accordance with the present disclosure, a positive caller category may therefore comprise a "verified caller" category. It should be noted that the verification of the caller does not necessarily guarantee that the caller is also not a telemarketer, political entity, survey organization, etc. Accordingly, in one example, a positive caller category may comprise "a verified caller with positive call history category." For example, a network operator may provide for mobile endpoint device applications to enable users to score or rate different calls, or to designate different calls as being one of several unwanted caller categories (or positive caller categories). Thus, a positive history may comprise no user-designations of a caller as being of an unwanted caller category within the last 2 months, the last 4 months, etc. Alternatively, or in addition, a positive call history may comprise a determination that the caller is not categorized within one of the existing unwanted caller categories. Similarly, a positive call history may comprise no complaints within the last 2 months, 4 months, etc. For instance, a network operator may maintain a complaint system where users can lodge specific complaints against particular telephone numbers. In addition, the network operator may share complaint information with and obtain similar information from other network operators, from one or more public databases and/or third-party sites which aggregate complaint information, and so forth.

In one example, a distinctive audible alert and/or vibration pattern for a verified caller may be applied in addition to a distinctive audible alert and/or vibration pattern for an unwanted caller category. For example, a user may generally be wary of engaging with survey callers. However, if the survey caller is verified to be a well-known organization (e.g., a university-based polling entity, etc.), the user may be more inclined to accept the call. Thus, in one example, in response to an incoming call request from a verified survey organization, the mobile endpoint device may present a distinctive audible alert and/or vibration pattern for "survey organization" in addition to a distinctive audible alert and/or vibration pattern for a verified caller (e.g., interleaving the audible alerts and/or vibration patterns in a repeating combined pattern, presenting the audible alert and/or vibration pattern for "survey organization" three times followed by a presentation of the audible alert and/or vibration pattern for a verified caller one time, and so on).

For unwanted calls which have only visual warning labels, a user is not aware of the warning status of the incoming call unless the user can see the screen of the mobile device. This may be inconvenient and disruptive if the mobile endpoint device is carried in the user's pocket or handbag. It may also be unsafe and distracting if the user is driving. A visual alert may further be difficult or impossible to perceive for visually impaired individuals. Providing a distinctive audible alert and/or vibration pattern for incoming unwanted calls allows a user to quickly and safely identify the status of the incoming call. For example, if the user is in a meeting, the user may feel the distinctive vibration pattern without touching the device. These and other aspects of the present disclosure are discussed in greater detail below in connection with the examples of FIGS. 1-4.

Figure 1:
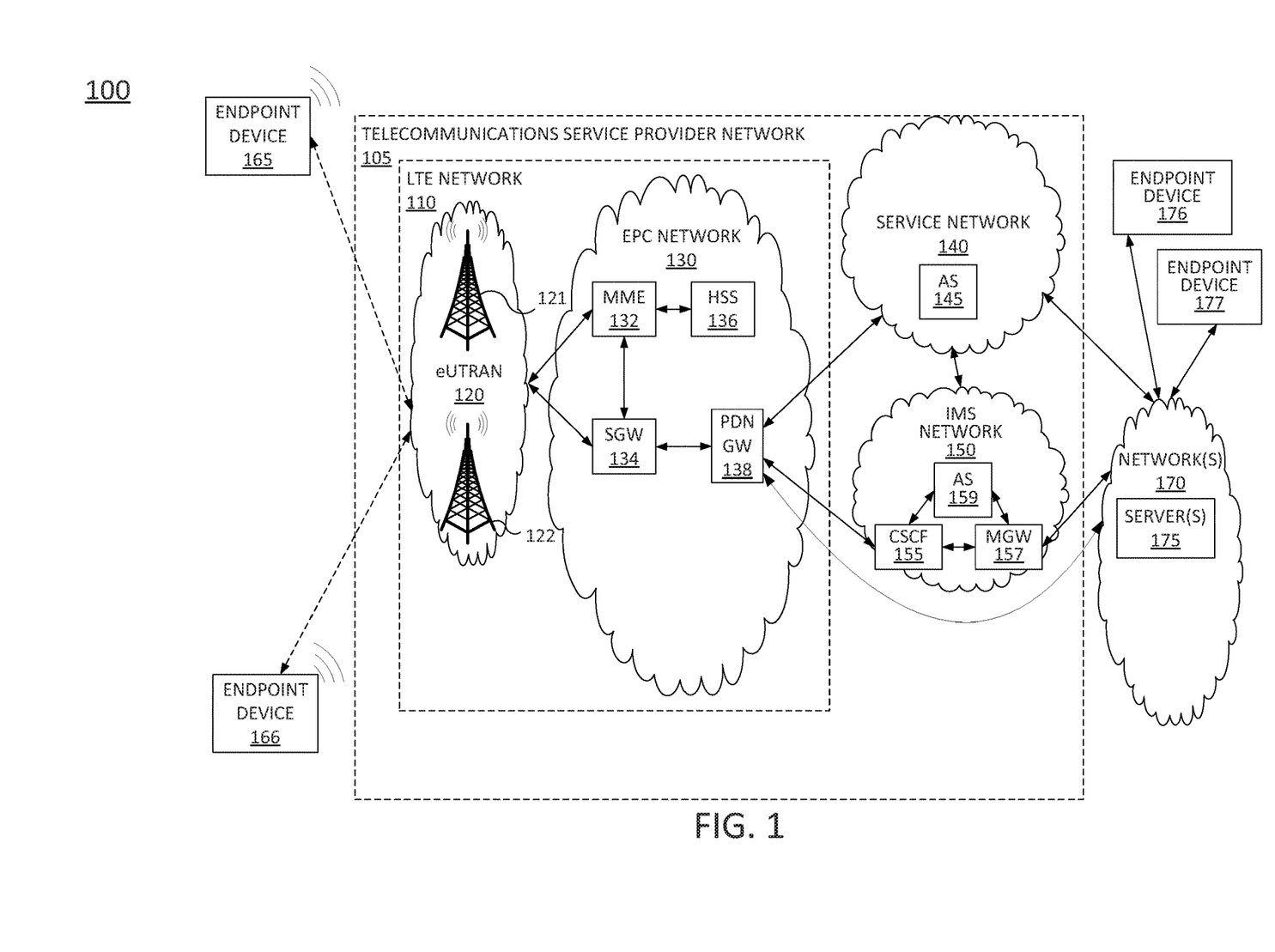
FIG. 1 illustrates an example of a system including a telecommunications service provider network, according to the present disclosure.

FIG. 1 illustrates an example network, or system 100 that may implement or support examples of the present disclosure. In one example, the system 100 includes a telecommunications service provider network 105. The telecommunications service provider network 105 may comprise a Long Term Evolution (LTE) network 110, a service network 140, and a core network, e.g., an IP Multimedia Subsystem (IMS) network 150. The system 100 may further include other networks 170 connected to the telecommunications service provider network 105. As shown in FIG. 1, the system 100 may connect endpoint devices 165 and 166 with various other devices, e.g., servers 175 in networks 170, application server 145 in service network 140, etc., endpoint devices 176 and 177, and/or with other components of telecommunications service provider network 105.

Figure 3:
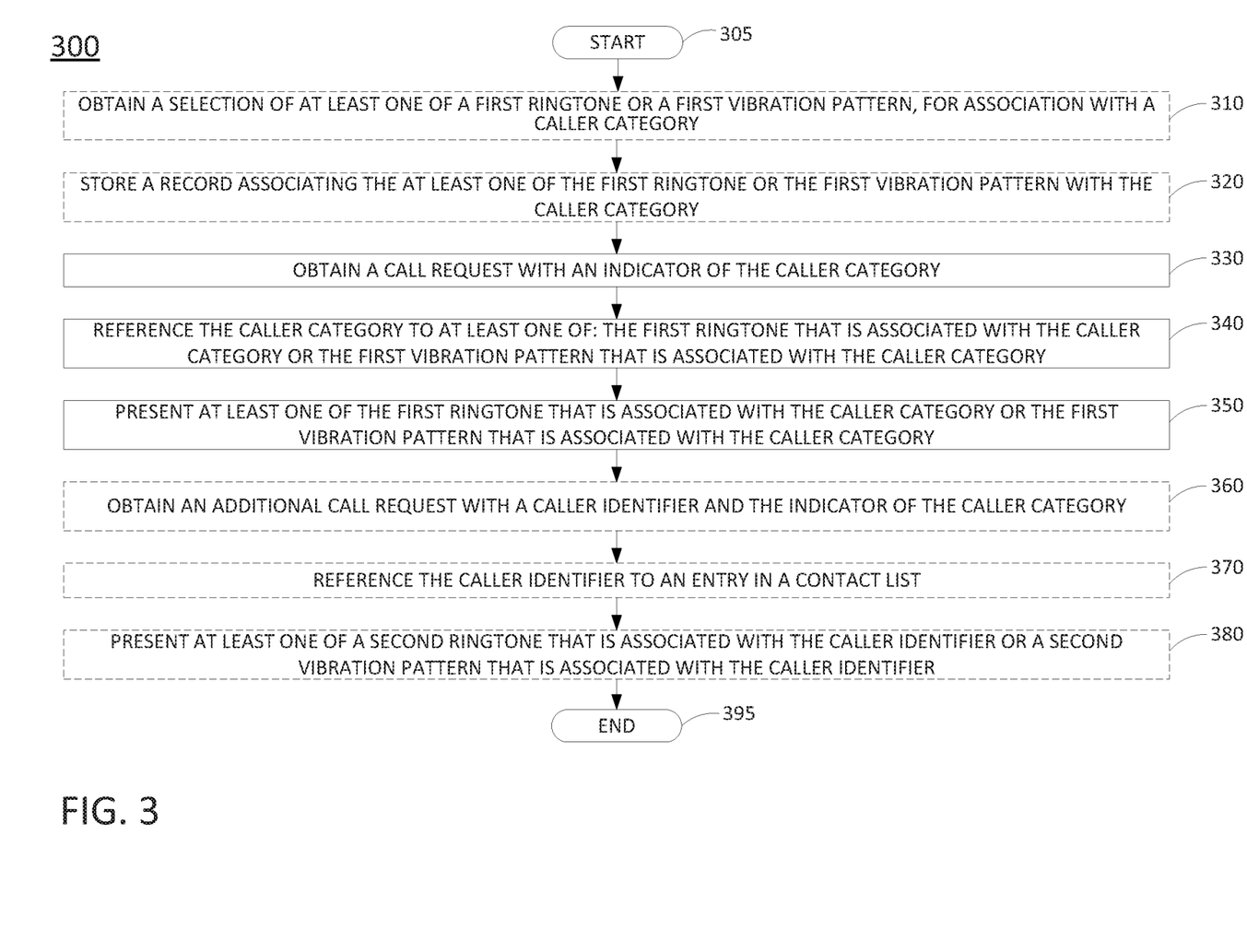
FIG. 3 illustrates a flowchart of an example method for obtaining a call request with an indicator of a caller category and presenting at least one of a ringtone or a vibration pattern that is associated with the caller category.

As illustrated in FIG. 1, each of the endpoint devices 165 and 166 may comprise, for example, a cellular telephone, a smartphone, a tablet computing device, a laptop computer, a wireless enabled wristwatch, or any other wireless and/or cellular-capable mobile telephony and computing devices (broadly, a "mobile endpoint device"). In addition, in one example, endpoint devices 165 and 166 may each comprise all or a portion of a computing device or processing system, such as computing system 400, and/or hardware processor element 402 as described in connection with FIG. 4 below, specifically configured to perform various steps, functions, and/or operations for obtaining a call request with an indicator of a caller category and presenting at least one of a ringtone or a vibration pattern that is associated with the caller category, in accordance with the present disclosure. An example method for obtaining a call request with an indicator of a caller category and presenting at least one of a ringtone or a vibration pattern that is associated with the caller category is illustrated in FIG. 3 and discussed in greater detail below.

Figure 4:
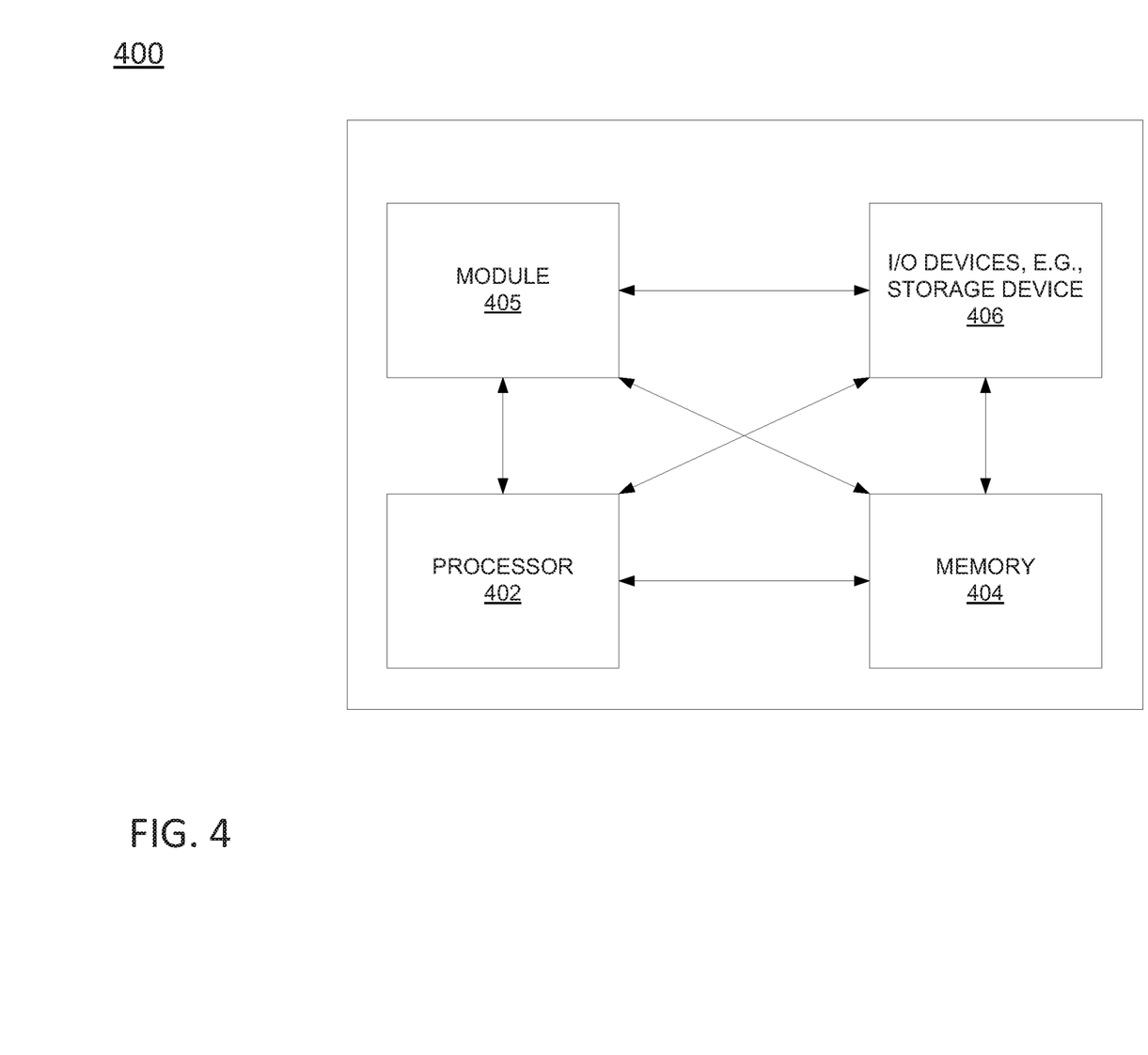
FIG. 4 illustrates a high-level block diagram of a computing device specially programmed to perform the functions described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 4 and discussed below) or multiple computing devices collectively configured to perform various steps, functions, and/or operations in accordance with the present disclosure.

In one example, the LTE network 110 comprises an access network and a core network. For example, as illustrated in FIG. 1, LTE network 110 may comprise an evolved Universal Terrestrial Radio Access Network (eUTRAN) 120 and an evolved packet core (EPC) network 130. The eUTRANs are the air interfaces of the 3rd Generation Partnership Project (3GPP) LTE specifications for mobile networks. In one example, EPC network 130 provides various functions that support wireless services in the LTE environment. In one example, EPC network 130 is an Internet Protocol (IP) packet core network that supports both real-time and non-real-time service delivery across a LTE network, e.g., as specified by the 3GPP standards. In one example, all eNodeBs, e.g., including eNodeBs 121 and 122 in the eUTRAN 120, are in communication with the EPC network 130. In operation, LTE user equipment or user endpoints (UEs), such as endpoint device 165 and/or endpoint device 166, may access wireless services via the eNodeBs 121 and 122 located in eUTRAN 120. It should be noted that any number of eNodeBs can be deployed in an eUTRAN.

In EPC network 130, network devices such as Mobility Management Entity (MME) 132 and Serving Gateway (SGW) 134 support various functions as part of the LTE network 110. For example, MME 132 is the control node for the LTE access networks, e.g., including eUTRAN 120. In one embodiment, MME 132 is responsible for user equipment tracking and paging (e.g., such as retransmissions), bearer activation and deactivation process, selection of the SGW, e.g., SGW 134, and user authentication. In one embodiment, SGW 134 routes and forwards user data packets, while also acting as the mobility anchor for the user plane during inter-eNodeB handovers and as the anchor for mobility between LTE and other wireless technologies, such as 2G, 3G, and 5G wireless networks.

In addition, EPC (common backbone) network 130 may comprise a Home Subscriber Server (HSS) 136 that contains subscription-related information (e.g., subscriber (or "user") profiles), performs authentication and authorization of a wireless service user, and provides information about the subscriber's location. The EPC network 130 may also comprise a packet data network (PDN) gateway 138 which serves as a gateway that provides access between the EPC network 130 and various data networks, e.g., service network 140, IMS network 150, networks 170, and the like. The packet data network gateway 138 is also referred to as a PDN gateway, a PDN GW or a PGW.

Figure 2:
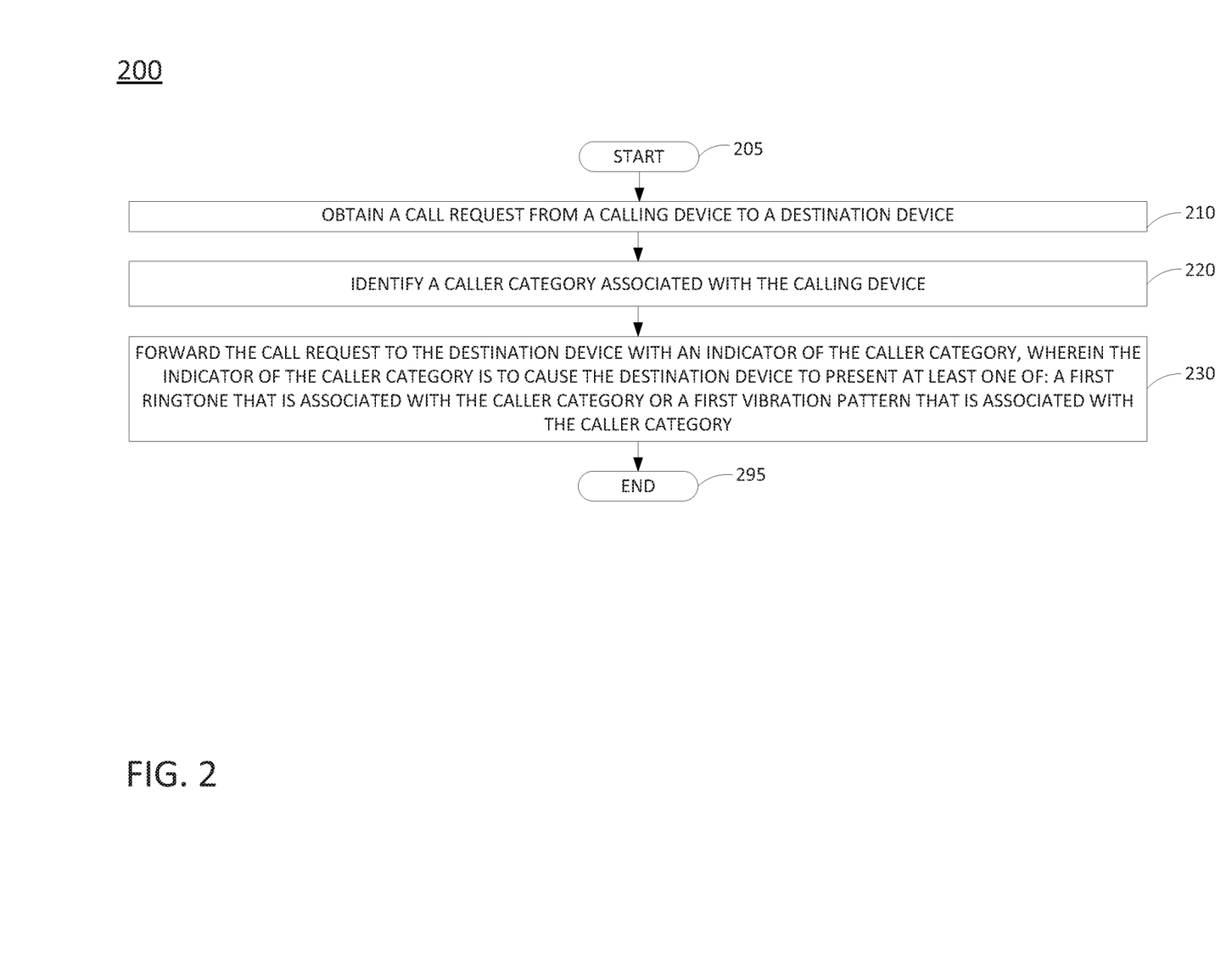
FIG. 2 illustrates a flowchart of an example method for forwarding a call request to a destination device with an indicator of a caller category to cause the destination device to present at least one of a ringtone or a vibration pattern associated with the caller category.

In one example, IMS network 150 may include a call session control function (CSCF) 155, which may further include the components of a Serving-Call Session Control Function (S-CSCF), a Proxy-Call Session Control Function (P-CSCF), and an Interrogating-Call Session Control Function (I-CSCF). As illustrated in FIG. 1, IMS network 150 may also include a media gateway (MGW) 157, which may handle translations between a packet-switched domain and circuit switched domain for Voice over Long Term Evolution (VoLTE) calls, for example. Additional components of IMS network 150 that are omitted from specific illustration in FIG. 1 may include: an IMS media server (MS) for handling and terminating media streams to provide services such as announcements, bridges, and Interactive Voice Response (IVR) messages for VoIP and cellular service applications, and for interacting with customers for media session management and other functions, a border gateway control function (BGCF), a media gateway control function (MGCF), one or more billing servers for billing one or more services, including cellular data and telephony services, wire-line phone services, Internet access services, and television services, and so forth. IMS network 150 may also include an application server (AS) 159. In one example, AS 159 may comprise all or a portion of a computing device or processing system, such as computing system 400, and/or hardware processor element 402 as described in connection with FIG. 4 below, specifically configured to perform various steps, functions, and/or operations for forwarding a call request to a destination device with an indicator of a caller category to cause the destination device to present at least one of a ringtone or a vibration pattern associated with the caller category. An example method for forwarding a call request to a destination device with an indicator of a caller category to cause the destination device to present at least one of a ringtone or a vibration pattern associated with the caller category is illustrated in FIG. 2 and discussed in greater detail below.

In one example, service network 140 may comprise one or more devices for providing services to subscribers, customers, and/or users. For example, telecommunications service provider network 105 may provide a cloud storage service, a web server hosting service, and other services. As such, service network 140 may represent aspects of telecommunications service provider network 105 where infrastructure for supporting such services may be deployed. In the example of FIG. 1, service network 140 may include an application server (AS) 145. In one example, AS 145 may comprise all or a portion of a computing device or processing system, such as computing system 400, and/or hardware processor element 402 as described in connection with FIG. 4 below, specifically configured to perform various steps, functions, and/or operations in connection with examples of the present disclosure for forwarding a call request to a destination device with an indicator of a caller category to cause the destination device to present at least one of a ringtone or a vibration pattern associated with the caller category, and in connection with examples of the present disclosure for obtaining a call request with an indicator of a caller category and presenting at least one of a ringtone or a vibration pattern that is associated with the caller category.

In one example, AS 145 may maintain a call detail record (CDR) database comprising CDRs gathered from components of telecommunications service provider network 105 relating to various calls traversing the network. In one example, AS 145 may also maintain a database of feedback from called parties relating to various callers (e.g., an indication of positive/negative/neutral, an indication of wanted/unwanted, and/or an indication of a specific category, such as fraud, spam, telemarketer, political, survey, etc.), reputation information from other communication networks or online sources, and so forth.

In one example, AS 145 may train and retrain one or more machine learning models (MLMs) for associating a caller ID with a caller category. For instance, data from the CDR database may be used as training data and/or testing data for generating or updating the one or more MLMs. In one example, the MLM(s) may be configured to process one or more other types of input data, such as credit information, credit card usage information, endpoint device location information, subscriber billing information, and so forth. In this regard, AS 145 may obtain such additional data from other components of telecommunications service provider network 105, such as customer billing and/or account records, records from a customer proprietary network information (CPNI) database (e.g., comprising different and/or additional information from that which is contained in the CDR database), etc. In one example, AS 145 may also obtain input data for the one or more MLMs from one or more other entities (e.g., via server(s) 175, as discussed below). In one example, the training and testing data may be "labeled." For instance, an administrator may perform a manual investigation of a caller ID to confirm that the caller ID is (or is not) associated with a particular category. In addition, the administrator (or multiple administrators or other authorized users) may make confirmations for numerous caller IDs. In each case of manual confirmation, the caller ID and all relevant data relating thereto, may be used as input data for training and/or testing the one or more MLMs. For examples where the one or more MLMs have generated predictions regarding the categorizations associated with various caller IDs, if a user later manually confirms that the MLM-generated categorization for a particular caller ID was correct or incorrect, this may also be used as feedback data, which may result in the retraining of the MLM(s) based upon the level of accuracy of the MLM(s).

In one example, the one or more trained MLMs may be used to generate a database of records (e.g., a list, a table, or similar data structure) associating caller IDs with caller categories. In one example, such a database may also be stored/maintained at AS 145. For instance, AS 145 may process CDRs and other data relating to different caller IDs to update caller ID categorizations, e.g., on an ongoing and/or continuous basis. Thus, new data relating to each caller ID may result in a change in categorization, a new categorization of a caller ID as being of a particular caller category (e.g., where there was previously no categorization), a de-categorization of a caller ID, and so forth. In one example, the database of records associating caller IDs with caller categories may also be deployed to AS 159 for use in processing live inbound call requests (e.g., calls to endpoint devices 165 and 166) in order to identify one or more caller categories (if any) for a caller/source device associated with each inbound call request.

It should be noted that in one example, a caller ID may be determined to be associated with more than one category. For instance, a binary classifier may involve a separation hyperplane in a feature space having dimensions relating to various input features to the MLM. While a caller ID may result in a vector being on either side of the separation hyperplane, a vector having a further distance from the hyperplane may be associated with a greater confidence score of the classifier decision (e.g., in/not in the category). Thus, in one example, if the caller ID is determined to fall within two or more categories, the category of the caller ID for record keeping purposes may be the category for which the classifier result has the greatest confidence score/likelihood score. Other types of MLMs may have a different metric for generating a confidence score or likelihood score or the classification output, which may be similarly used to select one of the caller categories when the caller ID is matched to two or more caller categories.

It should also be noted that different selection criteria may be applied to the MLM output(s) to determine whether a caller ID is to be associated with a particular caller category. For instance, again using a binary classifier as an example, the MLM may determine that input data for a particular caller ID comprises a vector that is on a side of the separation hyperplane that is indicative of being within a particular category. However, an administrator may configure the MLM output such that only those vectors having a sufficient distance from the hyperplane are to be indicated a being part of the caller category. For instance, a caller ID may not be associated with a fraudulent caller category unless the telecommunications service provider network 105 is very certain that this categorization is correct in accordance with the MLM.

In one example, networks 170 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 170 may include different types of networks. In another example, the other networks 170 may be the same type of networks. As illustrated in FIG. 1, networks 170 include one or more servers 175 which may each comprise all or a portion of a computing device or processing system, such as computing system 400, and/or hardware processor element 402 as described in connection with FIG. 4 below, specifically configured to perform various steps, functions, and/or operations in connection with examples of the present disclosure for forwarding a call request to a destination device with an indicator of a caller category to cause the destination device to present at least one of a ringtone or a vibration pattern associated with the caller category, and in connection with examples of the present disclosure for obtaining a call request with an indicator of a caller category and presenting at least one of a ringtone or a vibration pattern that is associated with the caller category.

As just one example, one or more of servers 175 may maintain a database, or several databases, from which AS 159 may obtain information that may be used in connection with categorizations of callers. For instance, information from the database(s) of servers 175 may comprise additional inputs to one or more MLMs that may be used for caller categorizations. For instance, servers 175 may maintain a fraud database associated with caller IDs. In one example, one or more of servers 175 may maintain a credit information database, a credit card usage database, a database cataloging complaints regarding a telephone number or other caller ID, and so on.

In one example, one or more of network(s) 170 may also connect endpoint devices 176 and 177 to telecommunications service provider network 105 and any one or more devices accessible via telecommunications service provider network 105 (such as endpoint devices 165 and 166), and/or to others of network(s) 170. For instance, in one example, endpoint devices 165 and 166 may communicate with endpoint devices 176 and 177 via PDN GW 138 and/or via PDN GW 138 and IMS network 150, e.g., for voice over LTE (VoLTE)-based calls or Wi-Fi calling. In this regard, endpoint devices 176 and 177 may comprise various endpoint devices, such as personal computers, desktop computers, laptop computers, personal digital assistants (PDAs), tablet computing devices, and so forth. In one example, endpoint devices 176 and 177 may comprise Voice over Internet Protocol (VoIP) telephones, or softphones. In another example, endpoint devices 176 and 177 may comprise telephones for circuit-switched voice communications. For instance, as noted above, network(s) 170 may comprise a PSTN or other circuit-switched (telephony) network.

To illustrate, a VoLTE call between endpoint device 176 and endpoint device 165 may traverse via PDN GW 138 and components of IMS network 150, which as noted above may include a call session control function (CSCF) 155 and a media gateway (MGW) 157. In one example, the VoLTE call may involve packetized data communications between MGW 157 and the endpoint device 165. For instance, a VoLTE call may comprise an Evolved Packet System (EPS) bearer between the endpoint device 165 and PDN GW 138, CSCF 155, or MGW 157. The MGW 157 may translate packetized data into circuit switched data for conveyance to endpoint device 176 via network(s) 170. Similarly, MGW 157 may translate circuit switched data from endpoint device 176 and/or the network(s) 170 to packetized data for conveyance to endpoint device 165. For instance, in one example, signaling messages, including call setup signaling messages for the VoLTE call, in the packetized domain may be conveyed via Session Initiation Protocol (SIP), while in the circuit-switched domain, such messaging may be conveyed in accordance with Integrated Systems Digital Network (ISDN) User Part (ISUP) signaling protocol of Signaling System No. 7 (SS7).

In an illustrative example, an unwanted call handling system offering distinctive audible and/or vibration pattern alerting may be provided by telecommunications service provider network 105 via a network-based component and an endpoint device-based component. For instance, the network-based component may comprise one or more devices of telecommunications service provider network 105, such as AS 159, and/or AS 159 in conjunction with one or more other devices, including AS 145, CSCF 155, MGW 157, PDN GW 138, etc. The endpoint device-based component may include an application deployed on respective endpoint devices (e.g., including at least endpoint devices 165 and 166).

Continuing with the present example, a caller, via device 176, may attempt to place a call to endpoint device 165 by dialing a telephone number associated with endpoint device 165. The call may originate in a circuit switched telephony network (e.g., one of networks 170) and may be routed to MGW 157 of IMS network 150. The MGW 157 may translate the circuit switched network-based call signaling (e.g., ISUP) into one or more packet-based call signaling messages (e.g., SIP-based call setup messages). In accordance with the present disclosure, the call setup signaling messages may be forwarded or copied to AS 159 by MGW 157 (and/or via one or more intermediate devices, such as an IMS media gateway controller (MGC) or the like). AS 159 may then extract a caller ID from the call setup signaling messages and determine whether the caller ID is associated with a caller category (e.g., an unwanted caller category). For instance, AS 159 may maintain and/or access a database of records associating caller IDs with different caller categories. In one example, the records may be generated by and obtained from AS 145, as described above. In one example, AS 159 may perform one or more operations of the example method 200 of FIG. 2 to determine a caller category.

Depending upon the caller category that is determined (or if no caller category is determined), AS 159 may instruct MGW 157 and/or CSCF 155 to process the call setup signaling messages accordingly. For instance, if the caller ID is determined to be associated with an unwanted caller category that is designated for network-based call blocking, such as a fraud caller category, AS 159 may instruct MGW 157 and/or CSCF 155 to drop the call setup signaling messages. In one example, one or more of these network-based components may also generate CDRs relating to the disposition of the call (in one example, these CDRs may be forward to and/or gathered by AS 145 for storage in a CDR database). If the caller ID is determined to be associated with another unwanted caller category, such as a survey organization caller category, a spam caller category, a robocaller category, etc., AS 159 may instruct MGW 157 and/or CSCF 155 to either change a caller name ID field of one or more of the call setup signaling messages to include a caller category label (e.g., "survey," "spam," "robocall," etc.), or to generate one or more additional signaling messages containing the caller category information for the intended destination (endpoint device 165).

In one example, if there is no caller category for the caller, or if the caller category is "unknown" or indeterminate, the call setup signaling messages may be allow to be forwarded without modification for caller category signaling and/or without additional signaling for caller category notification. However, in another example, AS 159 may cause the caller name ID field to be modified to include an "unknown," "indeterminate," or "unavailable" category designation, or may cause one or more additional signaling messages to be generated and sent to endpoint device 165 to convey similar information. It should also be noted that AS 159 may perform similar operations and may interact with and cause CSCF 155 and/or MGW 157 to handle the call setup signaling messages in a similar manner with respect to a determination of a positive caller category and/or a determination that the caller and/or endpoint device 176 is a verified caller (e.g., modifying the caller name ID field to include a "trusted caller" label, a "verified" label, etc., and/or sending one or more additional signaling messages identifying that the incoming call setup signaling messages are from a trusted caller, a verified caller, etc.).

In any case, endpoint device 165 may receive one or more call setup signaling messages relating to an incoming call request from endpoint device 176. An application running on endpoint device 165 may then process the call request according to one or more user-configured settings of the application. For instance, in one example, the endpoint device 165 may extract the caller category from the caller name ID field. Alternatively, the endpoint device 165 may obtain a notification of the caller category from one or more separate signaling messages as prompted by AS 159. The application on the endpoint device 165 may then determine whether the caller category is designated for a particular call handling. For example, one or more caller categories may be designated to have incoming call requests blocked or dropped (e.g., local endpoint device-based blocking). Thus, if the caller category is designated for blocking, the application may cause endpoint device 165 to block/drop the call. Alternatively, or in addition, one or more caller categories (e.g., both negative/unwanted and positive caller categories) may be designated for a distinctive audible alert (e.g., a ringtone) and/or vibration pattern call notification.

In one example, if there is no particular notification to the endpoint device 165 of a caller category, then the endpoint device 165 may generate notification(s) of the incoming call request according to a "standard" or "default" call notification. Similarly, for a caller category that is not designated for distinctive ringtone or vibration pattern alerting, the endpoint device 165 may utilize the "standard" or "default" call notification(s). For instance, endpoint device 165 may output a user-selected ringtone and/or a user-selected vibration pattern for general calls (e.g., assuming the endpoint device 165 is not in a "silent" mode, a "meeting" mode, or the like). On the other hand, if the caller category is designated for a distinctive ringtone and/or vibration pattern according to a record maintained by the application, the application may cause endpoint device 165 to generate the ringtone and/or vibration pattern (e.g., via a speaker, a headset, a vibration motor, etc.). Advantageously, with such a distinctive ringtone and/or vibration pattern, a user of endpoint device 165 may choose to answer or ignore the call request if it is from a survey organization, a robocaller, a telemarketer, etc., without specifically having to look at a screen of the endpoint device 165 to obtain relevant identifying information regarding the caller.

In one example, endpoint device 165 may also apply a local override to distinctive ringtone or vibration pattern alerting in certain circumstances. For instance, endpoint device 165 may scan a contact list of the user of endpoint device 165. If a caller name ID and/or telephone number of the incoming call request is found in the contact list, even if the caller name ID field and/or separate signaling message(s) indicate an unwanted caller category, the endpoint device 165 may output "standard" or "default" call notification(s) (or may apply a personalized call notification scheme that may be tailored to callers in the contact list).

It should be noted that the system 100 has been simplified. In other words, the system 100 may be implemented in a different form than that illustrated in FIG. 1. For example, the system 100 may be expanded to include additional networks, such as network operations center (NOC) networks, additional eUTRANs, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, various elements of eUTRAN 120, EPC network 130, service network 140, and IMS network 150 are omitted for clarity, including gateways or border elements providing connectivity between such networks, internal routers within EPC network 130, and so on. Similarly, due to the relatively large number of connections available between devices in the system 100, various links between MME 132, SGW 134, eNodeBs 121 and 122, PDN GW 138, AS 159, AS 145, CSCF 155, MGW 157 and other components of system 100 are also omitted for clarity.

In accordance with the present disclosure, any one or more of the components of EPC network 130 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 132 may comprise a vMME, SGW 134 may comprise a vSGW, and so forth. In this regard, the EPC network 130 may be expanded (or contracted) to include more or less components than the state of EPC network 130 that is illustrated in FIG. 1. For instance, EPC network 130 may be expanded to include additional PDN gateways, e.g., in the form of vPGWs, additional serving gateways (SGWs), e.g., in the form of vSGWs, and so forth. In one example, the SDN host devices may be deployed in one or more geographically diverse data centers. Accordingly, in one example, the network may be segregated into a number of zones, where different VNFs may be deployed in different zones depending upon the respective locations of the one or more data centers.

In addition, although aspects of the present disclosure have been discussed above in the context of a long term evolution (LTE)-based network, examples of the present disclosure are not so limited. For instance, examples of the present disclosure may relate to other types of wireless networks (e.g., a 2G network, a 3G network, a 5G network and the like, an IEEE 802.11-based network, or a future technology or standard-based network, a network implementing various combinations of any one or more of the foregoing technologies, and so on). In one example, AS 159, AS 145, servers 175, and/or other components may comprise cloud-based and/or distributed data storage and/or processing systems comprising one or more servers at a same location or at different locations. However, for ease of illustration, these components are depicted as standalone devices in FIG. 1. In addition, although the AS 159 is illustrated as a component of IMS network 150, AS 145 is illustrated as a component of service network 140, and so on, in other examples, any one or more of these components may be deployed in a different configuration. For instance, in one example, AS 145 may comprise part of IMS network 150. In another example, one or more functions of AS 159 described above may alternatively or additionally be deployed in EPC network 130. For instance, a separate application server comprising one or more physical devices may implement all or a portion of the functions of AS 159 described above. In addition, other functions described in connection with CSCF 155 and MGW 157 may alternatively or additional be deployed in EPC network 130. For example, network-based call blocking, caller name ID modification, or other aspects may be implemented at PDN GW 138.

It should also be noted that the example described above relates to a VoLTE call originating in a circuit switched network. However, the same or similar process may be applied to a VoLTE call originating from a VoIP phone, from an LTE-based endpoint device of another cellular network, from an endpoint device utilizing a 3G wireless access network, and so forth. In addition, the foregoing example is described with respect to a VoLTE call. However, the same or a similar process may be applied to incoming call requests to endpoint device 165 and/or endpoint device 166 in a circuit switched fall back scenario (e.g., a Uniform Mobile Telecommunications System (UMTS)/3G fallback). In addition, the same or a similar process may also be applied in a 5G cellular network environment and/or in accordance with any other future packet-based cellular voice and/or data communication technology. Thus, these and other modifications are all contemplated within the scope of the present disclosure.

FIG. 2 illustrates a flowchart of an example method 200 for forwarding a call request to a destination device with an indicator of a caller category to cause the destination device to present at least one of a ringtone or a vibration pattern associated with the caller category. In one example, steps, functions and/or operations of the method 200 may be performed by a device as illustrated in FIG. 1, e.g., by AS 159, or any one or more components thereof, or by AS 159 and/or any one or more components thereof in conjunction with one or more other components of the system 100, such as one or more of AS 145, MGW 157, CSCF 155, PDN GW 138, server(s) 175, and so forth. In one example, the steps, functions, or operations of method 200 may be performed by a computing device or processing system, such as computing system 400, and/or a hardware processor element 402 as described in connection with FIG. 4 below. For instance, the computing system 400 may represent at least a portion of an application server or other device(s) in accordance with the present disclosure. For illustrative purposes, the method 200 is described in greater detail below in connection with an example performed by a processing system. In one example, the steps, functions, or operations of method 200 may be performed by a processing system comprising a plurality of such computing devices as represented by the computing system 400. The method 200 begins in step 205 and proceeds to step 210.

At step 210, the processing system (e.g., deployed in a telecommunication network) obtains a call request from a calling device to a destination device. In accordance with the present disclosure, the destination device may comprise a mobile endpoint device (e.g., a cellular smartphone or other cellular-based endpoint device). In one example, cellular voice service may be provided by the telecommunication network to the destination device in accordance with VoLTE, circuit switched fall back (CSFB), 5G, or the like. For instance, the call request may comprise one or more call setup signaling messages, such as a SIP INVITE, or the like. In one example, for calls originating in a circuit-switched telephony network, the call setup signaling message(s) may be translated into packet-based signaling messages (e.g., SIP) from circuit switching-based signaling (e.g., ISUP).

At step 220, the processing system identifies a caller category associated with the calling device. For instance, step 220 may include extracting a caller identifier from the call request and obtaining an entry in a caller category database associated with the caller identifier, the entry including the caller category. For instance, the caller category may be associated with the caller identifier and stored in the entry in the database in accordance with at least one machine learning model (MLM). The at least one MLM may be configured to assign the caller identifier to the caller category from among a plurality of possible caller categories based upon data gathered via the communication network relating to a plurality of calls associated with the caller identifier. For instance, the input data for the MLM may comprise CDR data and/or feedback from called parties. The CDR data can include a number of calls associated with a telephone number or other caller identifier, the IP address(es) associated with the telephone number, the location on the origination of the call (e.g., for mobile devices, or devices that are generating calls from or via an IP network), etc. In one example, the caller identifier may be a telephone number, but could also be an IP address, MAC address, IMEI, IMSI, etc., or any combination thereof. In one example, the MLM(s) may also be configured to process data from one or more external sources of data, such as credit report data, credit card usage data, billing and/or account records, and so forth. In one example, the training, testing, and/or operation of the MLM(s) may be performed by the processing system. In another example, the processing system may obtain the database of records associating caller categories with caller identifiers from an external device or processing system running the one or more MLMs.

In one example, the caller category may be identified from among a plurality of caller categories comprising two or more of: a fraud (scam) caller category, a robo-caller category, a political caller category, a fundraising caller category, a survey caller category, a telemarketer caller category, a debt collector caller category, a verified caller category, or a verified caller with positive call history category. In one example, the caller category may comprise a verified caller category. For instance, the caller category may comprise a verified caller with positive call history category. In one example, the verification may be in accordance with a caller ID authentication scheme, such as SHAKEN/STIR (Signature-based Handling of Asserted Information Using toKENs (SHAKEN) and Secure Telephone Identity Revisited (STIR)) technology.

At step 230, the processing system forwards the call request to the destination device with an indicator of the caller category, where the indicator of the caller category is to cause the destination device to present at least one of: a first ringtone that is associated with the caller category or a first vibration pattern that is associated with the caller category. In one example, step 230 may include changing a caller name identifier (ID) field of the call request to include the caller category. In another example, step 230 may comprise providing a designated network signaling to the destination device that is indicative of the caller category, such as a special/custom header field (e.g., in SIP request(s)), or a separate signal message/communication that is designated for caller category signaling.

As noted above, the caller category may be one of a plurality of caller categories. In one example, for the destination device or a user of the destination device, each category of the plurality of caller categories may be assigned for one of: call blocking (e.g., locally at the destination device), at least one of a distinctive ringtone or a distinctive vibration pattern call signaling, or a default call signaling. In one example, the destination device may apply a local override of distinctive ringtone and/or vibration pattern alerting, e.g., for callers in a user's contact list.

Following step 230, the method 200 proceeds to step 295. At step 295, the method 200 ends.

It should be noted that the method 200 may be expanded to include additional steps, or may be modified to replace steps with different steps, to combine steps, to omit steps, to perform steps in a different order, and so forth. For instance, in one example the processing system may repeat one or more steps of the method 200 with respect to one or more additional call requests for the same destination device, a different destination device, the same calling device, a different calling device, etc. In one example, the method 200 may include overriding distinctive ringtone and/or vibration pattern alerting in the communication network. For instance, a user of the destination device may allow an application to share the user's contact list with the network-based processing system, which may check the contact list and override the caller category signaling. Thus, these and other modifications are all contemplated within the scope of the present disclosure.

FIG. 3 illustrates a flowchart of an example method 300 for obtaining a call request with an indicator of a caller category and presenting at least one of a ringtone or a vibration pattern that is associated with the caller category. In one example, steps, functions and/or operations of the method 300 may be performed by a device as illustrated in FIG. 1, e.g., by one of endpoint devices 165 or 166, by any one or more components thereof, and/or by any one or more components thereof in conjunction with one or more other components of the system 100, such as one or more of AS 159, AS 145, PDN GW 138, CSCF 155, MGW 157, and so forth. In one example, the steps, functions, or operations of method 300 may be performed by a computing device or processing system, such as computing system 400, and/or a hardware processor element 402 as described in connection with FIG. 4 below. For instance, the computing system 400 may represent at least a portion of an endpoint device or other device(s) in accordance with the present disclosure. For illustrative purposes, the method 300 is described in greater detail below in connection with an example performed by a processing system. In one example, the steps, functions, or operations of method 300 may be performed by a processing system comprising a plurality of such computing devices as represented by the computing system 400. The method 300 begins in step 305 and may proceed to optional step 310 or to step 330.

At optional step 310, the processing system may obtain a selection of at least one of the first ringtone or the first vibration pattern, for association with a caller category. For instance, the selection may be made by user of an apparatus (e.g., a mobile endpoint device) of the processing system via a keyboard, a touchscreen, a mouse, a voice command, or other input. In one example, the input may be processed via a caller category alerting application that provides for distinctive ringtone and/or vibration pattern alerts. In one example, the caller category may be one of a plurality of caller categories, which may include: a fraud (scam) caller category, a robo-caller category, a political caller category, a fundraising caller category, a survey caller category, a telemarketer caller category, a debt collector caller category, a verified caller category, or a verified caller with positive call history category. In addition, in one example, for the endpoint device or a user of the endpoint device, each of the plurality of caller categories may be assigned for one of: call blocking, at least one of a distinctive ringtone or a distinctive vibration pattern call signaling, or a default call signaling.

At optional step 320, the processing system may store a record associating the at least one of the first ringtone or the first vibration pattern with the caller category. In one example, the record may be one of a plurality of records (e.g., in a database), where each record may relate a different caller category with a distinctive ringtone and/or vibration pattern for incoming call alerting.

At step 330, the processing system obtains a call request with an indicator of a caller category. In one example, the indicator of the caller category may be contained in a caller name identifier (ID) field of the call request. In another example, the indicator of the caller category may comprise a designated network signaling that is indicative of the caller category. For instance, the designated network signaling may comprise a special/custom header field (e.g., in SIP request(s)), or a separate signal message/communication that is designated for caller category signaling. In one example, the caller category may have been determined via a component of a telecommunication network via a machine learning model and inserted into the caller name identifier field or sent via the designated network signaling.

At step 340, the processing system references the caller category to at least one of: a first ringtone that is associated with the caller category or a first vibration pattern that is associated with the caller category. In one example, the referencing is via the record that is stored at optional step 320. For instance, in one example, step 340 may comprise performing a lookup from among records that are stored by the processing system and that associate distinctive ringtones and/or vibration patterns with different caller categories.

At step 350, the processing system presents at least one of the first ringtone that is associated with the caller category or the first vibration pattern that is associated with the caller category. For instance, the presenting may be via a speaker, a headset, a vibration motor, or the like of the processing system.

At optional step 360, the processing system may obtain an additional call request with a caller identifier and the indicator of the caller category. For instance, optional step 360 may comprise the same or similar operations as described above in connection with step 330.

At optional step 370, the processing system may reference the caller identifier to an entry in a contact list. For instance, step 370 may comprise performing a lookup to determine that the caller identifier is within the contact list of a user of an apparatus/endpoint device of the processing system.

At optional step 380, the processing system may present at least one of a second ringtone that is associated with the caller identifier or a second vibration pattern that is associated with the caller identifier. For instance, the second ringtone may be different from the first ringtone that is associated with the caller category and/or the second vibration pattern may be different from the first vibration pattern that is associated with the caller category. It should be noted that the second ringtone and/or second vibration pattern may be specific to the particular caller identifier (e.g., a personalized ringtone), or may be a "default" ringtone and/or vibration pattern designated for incoming calls from all callers that are not determined to be of a particular caller category (e.g., an unwanted caller category). In addition, it should also be noted that the operations of optional step 370 and optional step 380 may comprise an override of distinctive ringtone and/or vibration pattern alerting for indicating a caller category. For example, a user may have a friend or family memory who works as a telemarketer. The number may be designated for distinctive ringing and/or distinctive vibration alerting according to the caller category. However, since the calling telephone number (or other caller identifier) may be in the user's contact list, the processing system may override the ringing and/or vibration designation of the caller category and instead treat the call as a known caller, trusted caller, etc.

Following step 350 or any one or more of optional steps 360-380, the method 300 may proceed to step 395. At step 395, the method 300 ends.

It should be noted that the method 300 may be expanded to include additional steps, or may be modified to replace steps with different steps, to combine steps, to omit steps, to perform steps in a different order, and so forth. For instance, in one example the processing system may repeat one or more steps of the method 300, such as steps 310-350, steps 310-380, etc. In one example, the method 300 may include operations for local call blocking. For instance, a certain caller category, or categories may be designated for call dropping/call blocking (e.g., at the endpoint device/apparatus). In this case, the call request may be obtained with an indicator of the caller category. The processing system may reference a record for the caller category, may determine that calls from callers of this caller category are to be dropped, and may drop the call accordingly (e.g., by not replying to a SIP INVITE, or the like, by sending a SIP response denying the call request (e.g., sending a 4xx, 5xx, or 6xx response, such as a 603 decline, a 607 reject, etc.)).

It should also be noted that in one example, a user may still obtain additional information visually via a display screen of the apparatus/endpoint device. For instance, for a call from a caller that is determined to be in a "telemarketer" caller category, an application of the endpoint device may present a confidence score of the categorization (e.g., 70 percent confidence of being a telemarketer, 80 percent confidence, etc.). Thus, in one example, a user may still obtain more detailed information via the display screen, if desired. In addition, in one example, the present disclosure may also enable a user to select a distinctive non-screen-based visible alert for a caller category (e.g., a distinctive color and or flashing/blinking pattern may be assigned to a caller category and applied via a light emitting diode (LED) or other light source). In this way, while a user may still have to look at the endpoint device, information regarding the caller category may still be more quickly conveyed, without the user having to engage a screen of the device, view icons, read words, enter a passcode, etc.). Thus, these and other modifications are all contemplated within the scope of the present disclosure.

In addition, although not expressly specified above, one or more steps of the example method 200 or example method 300 may include a storing, displaying and/or outputting step as required for a particular application. In other words, any data, records, fields, and/or intermediate results discussed in the method(s) can be stored, displayed and/or outputted to another device as required for a particular application. Furthermore, operations, steps, or blocks in FIGS. 2 and 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 4 depicts a high-level block diagram of a computing system 400 (e.g., a computing device or processing system) specifically programmed to perform the functions described herein. For example, any one or more components or devices illustrated in FIG. 1 or described in connection with the method 300 may be implemented as the computing system 400. As depicted in FIG. 4, the computing system 400 comprises a hardware processor element 402 (e.g., comprising one or more hardware processors, which may include one or more microprocessor(s), one or more central processing units (CPUs), and/or the like, where hardware processor element may also represent one example of a "processing system" as referred to herein), a memory 404, (e.g., random access memory (RAM), read only memory (ROM), a disk drive, an optical drive, a magnetic drive, and/or a Universal Serial Bus (USB) drive), a module 405 for forwarding a call request to a destination device with an indicator of a caller category to cause the destination device to present at least one of a ringtone or a vibration pattern associated with the caller category or for obtaining a call request with an indicator of a caller category and presenting at least one of a ringtone or a vibration pattern that is associated with the caller category, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 402 is shown, it should be noted that the computing device may employ a plurality of hardware processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor element 402 can also be configured or programmed to cause other devices to perform one or more operations as discussed above. In other words, the hardware processor element 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for forwarding a call request to a destination device with an indicator of a caller category to cause the destination device to present at least one of a ringtone or a vibration pattern associated with the caller category or for obtaining a call request with an indicator of a caller category and presenting at least one of a ringtone or a vibration pattern that is associated with the caller category (e.g., a software program comprising computer-executable instructions) can be loaded into memory 404 and executed by hardware processor element 402 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for forwarding a call request to a destination device with an indicator of a caller category to cause the destination device to present at least one of a ringtone or a vibration pattern associated with the caller category or for obtaining a call request with an indicator of a caller category and presenting at least one of a ringtone or a vibration pattern that is associated with the caller category (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. An apparatus comprising:
   a processing system including at least one processor; and
   a computer-readable medium storing instructions which, when executed by the processing system when deployed in a communication network, cause the processing system to perform operations, the operations comprising:
   obtaining a call request from a calling device to a destination device;
   identifying a caller category associated with the calling device; and
   forwarding the call request to the destination device via the communication network with an indicator of the caller category, wherein the indicator of the caller category is to cause the destination device to present at least one of: a first ringtone that is associated with the caller category or a first vibration pattern that is associated with the caller category, wherein the forwarding the call request to the destination device with the indicator of the caller category comprises providing a designated network signaling to the destination device that is indicative of the caller category.

2. The apparatus of claim 1, wherein the identifying the caller category comprises:
   extracting a caller identifier from the call request; and
   obtaining an entry in a caller category database associated with the caller identifier, the entry including the caller category.

3. The apparatus of claim 2, wherein the caller category is associated with the caller identifier and stored in the entry in the caller category database in accordance with at least one machine learning model.

4. The apparatus of claim 3, wherein the at least one machine learning model is configured to assign the caller identifier to the caller category from among a plurality of possible caller categories based upon data gathered via the communication network relating to a plurality of calls associated with the caller identifier.

5. The apparatus of claim 4, wherein the data comprises at least one of:
   call detail records; or
   feedback from called parties.

6. The apparatus of claim 1, wherein the forwarding the call request to the destination device with the indicator of the caller category comprises:
   changing a caller name identifier field of the call request to include the caller category.

7. The apparatus of claim 1, wherein the caller category is one of a plurality of caller categories comprising two or more of:
   a fraud caller category;
   a robo-caller category;
   a political caller category;
   a fundraising caller category;
   a survey caller category;
   a telemarketer caller category;
   a debt collector caller category;
   a verified caller category; or
   a verified caller with positive call history category.

8. The apparatus of claim 1, wherein the caller category comprises a verified caller category.

9. The apparatus of claim 1, wherein the caller category comprises a verified caller with positive call history category.

10. The apparatus of claim 1, wherein the caller category is one of a plurality of caller categories, wherein for the destination device or a user of the destination device, each category of the plurality of caller categories is assigned for one of:
    call blocking;
    at least one of a distinctive ringtone or a distinctive vibration pattern call signaling; or
    a default call signaling.

11. A method comprising:
    obtaining, by a processing system including at least one processor deployed in a communication network, a call request from a calling device to a destination device;
    identifying, by the processing system, a caller category associated with the calling device, wherein the identifying the caller category comprises:
    extracting a caller identifier from the call request; and
    obtaining an entry in a caller category database associated with the caller identifier, the entry including the caller category, wherein the caller category is associated with the caller identifier and stored in the entry in the caller category database in accordance with at least one machine learning model, wherein the at least one machine learning model is configured to assign the caller identifier to the caller category from among a plurality of possible caller categories based upon data gathered via the communication network relating to a plurality of calls associated with the caller identifier, wherein the caller category comprises a verified caller with positive call history category; and forwarding, by the processing system, the call request to the destination device via the communication network with an indicator of the caller category, wherein the indicator of the caller category is to cause the destination device to present at least one of: a first ringtone that is associated with the caller category or a first vibration pattern that is associated with the caller category, wherein the forwarding the call request to the destination device with the indicator of the caller category comprises providing a designated network signaling to the destination device that is indicative of the caller category.

12. An endpoint device comprising:
a processing system including at least one processor; and
a computer-readable medium storing instructions which, when executed by the processing system, cause the processing system to perform operations, the operations comprising:
obtaining, via a communication network, a call request with an indicator of a caller category, wherein the indicator of the caller category comprises a designated network signaling that is indicative of the caller category;
referencing the caller category to at least one of: a first ringtone that is associated with the caller category or a first vibration pattern that is associated with the caller category; and
presenting at least one of the first ringtone that is associated with the caller category or the first vibration pattern that is associated with the caller category.

13. The endpoint device of claim 12, the operations further comprising:
obtaining a selection of at least one of the first ringtone or the first vibration pattern, for association with the caller category; and
storing a record associating the at least one of the first ringtone or the first vibration pattern with the caller category, wherein the referencing is via the record that is stored.

14. The endpoint device of claim 12, wherein the caller category is one of a plurality of categories comprising two or more of:
a fraud caller category;
a robo-caller category;
a political caller category;
a fundraising caller category;
a survey caller category;
a telemarketer caller category;
a debt collector caller category;
a verified caller category; or
a verified caller with positive call history category.

15. The endpoint device of claim 12, wherein the indicator of the caller category is contained in a caller name identifier field of the call request.

16. The endpoint device of claim 12, the operations further comprising:
obtaining an additional call request with a caller identifier and the indicator of the caller category;
referencing the caller identifier to an entry in a contact list; and
presenting at least one of a second ringtone that is associated with the caller identifier or a second vibration pattern that is associated with the caller identifier.

17. The endpoint device of claim 16, wherein
the second ringtone is different from the first ringtone that is associated with the caller category.

18. The endpoint device of claim 12, wherein the caller category is one of a plurality of caller categories, wherein for the endpoint device or a user of the endpoint device, each category of the plurality of caller categories is assigned for one of:
call blocking;
at least one of a distinctive ringtone or a distinctive vibration pattern call signaling; or
a default call signaling.

19. The endpoint device of claim 16, wherein the second vibration pattern is different from the first vibration pattern that is associated with the caller category.

* * * * *